350-377 SR
XR 3,228,015
SEARCH ROOM

MAGNETO-OPTIC RECORDING SYSTEM

Filed May 19, 1961 3 Sheets-Sheet 1

INVENTORS:
John J. Miyata
Theodore Lentz
Louis A. Kline
By John J. Matlago
Richard L. Kague
Their Attorneys

3228015
OR IN 360/114

MAGNETO-OPTIC RECORDING SYSTEM

Filed May 19, 1961 3 Sheets-Sheet 2

INVENTORS:
John J. Miyata
Theodore Lentz

By Louis A. Kline
John J. Matlago
Richard J. [illegible]
Their Attorneys.

MAGNETO-OPTIC RECORDING SYSTEM

Filed May 19, 1961 3 Sheets-Sheet 3

INVENTORS:
John J. Miyata
Theodore Lentz
By Louis A. Kline
John J. Matlago
Richard J. [illegible]
Their Attorneys United States Patent Office 3,228,015

Patented Jan. 4, 1966

3,228,015

MAGNETO-OPTIC RECORDING SYSTEM

John J. Miyata, Monterey Park, and Theodore Lentz, Hermosa Beach, Calif., assignors to The National Cash Register Company, Dayton, Ohio, a corporation of Maryland Filed May 19, 1961, Ser. No. 111,267
15 Claims. (Cl. 340—174.1)

This invention is directed to magnetic recording systems and more particularly to systems for magnetically recording data and improvements in optically and electronically reproducing magnetically stored data.

In many magnetic recording arrangements, such as found in drum or disc memories in which magnetic recording and reproducing heads do not contact the record medium, the major limitation in reproduction is due to the separation of the magnetic reproducing heads from the record surface. Direct contact of the magnetic heads and the record surface is undesirable in these systems because of head and coating wear, particularly at the high speeds involved. The disadvantages of using the magnetic reproducing heads become more pronounced as the resolution characteristics of magnetic record surfaces are improved to provide for high density storage of data. As the separation between the magnetic reproducing head and record surfaces increases, the signal deteriorates because the conventional magnetic reproducing head is sensitive only to the flux external to the record surface. This loss in signal resolution is inherent in any type of magnetic reproducing head requiring external flux linkages from the record surface to generate a signal. The optical systems disclosed in a copending application entitled "Magneto-Optical Translator," Serial No. 842,407, filed September 25, 1959, by John J. Miyata, and assigned to the same assignee, overcome the foregoing disadvantages of the magnetic reproducing head, and the present systems are improvements of the systems disclosed therein.

The systems disclosed in the prior copending application, and also the present systems, make use of the interaction between light and matter when the latter is magnetized. This interaction is known as the magneto-optical effect. The present systems are directed to the particular aspect of magneto-optics known as the longitudinal or meridional Kerr effect in which the interaction occurring between light and a magnetized record surface produces an optical rotation of the plane of polarization when the light is reflected from the record surface. The record surface comprises a thin film or coating of ferromagnetic material which is magnetized in the plane of the film. The optical rotation of the light reflected from the magnetized surface is detected to reproduce the magnetically recorded signal.

In the systems disclosed in the cited prior copending application, only one half of the light obtained from the light source is effective in reproducing a magnetically recorded signal because of the requirement that the incident light be polarized. The polarizer eliminates one half of the light provided by the source from reaching the record surface. Also, the noise produced by variation in the reflectance of the record surface tends to cause interference in reproduction because of the high average light level relative to the signal amplitude. In the present system both of these disadvantages have been overcome. The need for a polarizer has been eliminated and the only light or energy loss is due to a polarizing light beam splitter which is in the path of the light reflected from the record surface. Also, the extraneous signals or noise produced by fluctuations in intensity of the light source and variations in the reflectance of the recording surface is eliminated in the arrangement of the present systems.

A separate and distinct advantage of the present systems is found in a discovery which provides higher density storage in the recording of binary data. Recording on conventional magnetic films or coatings imposes a severe limitation on the maximum recording density that can be realized. In magnetically recording binary data on conventional record surfaces, the magnetization of individual binary signal storage areas or bit areas is aligned parallel to the signal track. This manner of magnetization is known as longitudinal recording. In the preferred embodiment of the present invention, the recording is made transverse, i.e., normal, to the signal track on a magnetic record surface which comprises a thin film or coating having strong uniaxial magnetic anisotropy. The magnetic characteristics of this film or coating are such that the magnetization, in the absence of such an external magnetic field, exists only in the directions of remanent magnetization which are transverse to the signal track. The transverse recordings of binary signals are made on the anisotropic thin film or coating by applying the magnetic field of a conventional record head almost normal to the directions of remanent magnetization, i.e., the easy magnetic axis, so that the direction of remanent magnetization will depend upon the direction of current flow in the magnetic record head and in the resulting field created thereby. Transverse recordings made in this manner can be reproduced by conventional magnetic reproducing heads. The term "transverse recording," as used herein, is defined as a recorded pattern in which the remanent magnetization is perpendicular to the track and in the plane of the film even though the applied field during recording was parallel to the track. However, by employing the preferred optical system apparatus of the present invention, excellent reproduction of transverse recordings of binary signals recorded at storage densities greater than 3,000 bits per lineal inch can be made. Binary signal densities of this magnitude and signal track densities greater than 100 tracks per lineal inch provide a record surface storage density exceeding 300,000 bits per square inch of record surface area.

It is an object of the present invention, therefore, to provide a magnetic recording system having the foregoing features and advantages.

Another object of this invention is the provision of an improved magneto-optical reproducing system for a magnetic memory.

Another object is to provide a system for magnetically storing data in a transverse recording for very high density recording.

Still another object of the present invention is to provide an improved magneto-optical reproducing system in which substantially all the light made available is directed onto a record surface for reproducing data signals magnetically stored on the record surface.

A further object of this invention is the provision of a magneto-optical system for reproducing magnetically stored data in which the quality of reproduction of the data has been substantially improved.

A still further object of the present invention is to provide a magneto-optical system which eleminates or greatly reduces noise in the reproduction of magnetically stored data signals.

Other objects and features of the invention will become apparent to those skilled in the art as the disclosure is made in the following detailed description of preferred embodiments of the invention as illustrated in the accompanying sheets of drawings in which:

FIG. 1 is a schematic diagram of the magnetic recording system apparatus illustrating the preferred embodiment of the invention;

FIG. 1*a* is a schematic illustration of a particular polarizing light beam splitter which is suitable for use in the system apparatus shown in FIG. 1;

Figures 1, 2, 3:
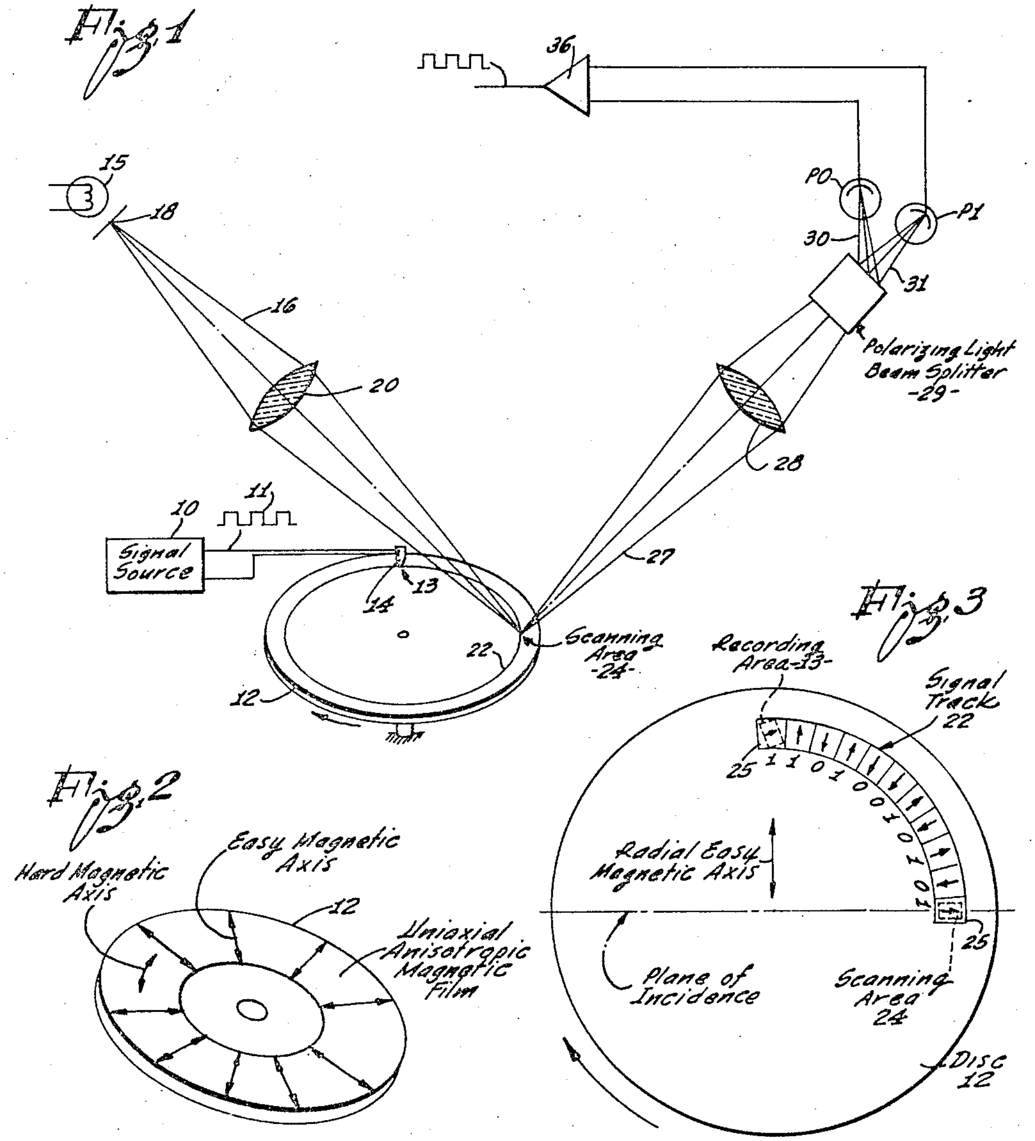
FIG. 2 is a diagrammatic illustration of the magnetic anisotropy of the storage disc shown in FIG. 1 for providing transverse recording of binary data signals.
FIG. 3 is a diagrammatic illustration of the storage disc shown in FIG. 1 in which typical magnetically recorded binary data signals are indicated to be stored transversely along a signal track, as illustrated schematically.
Figure 5:
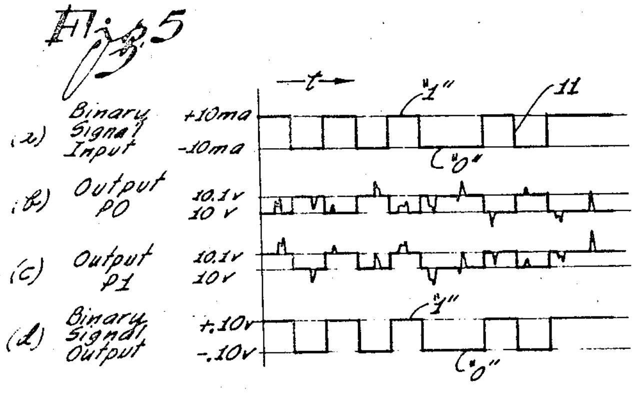
Figure 6B:
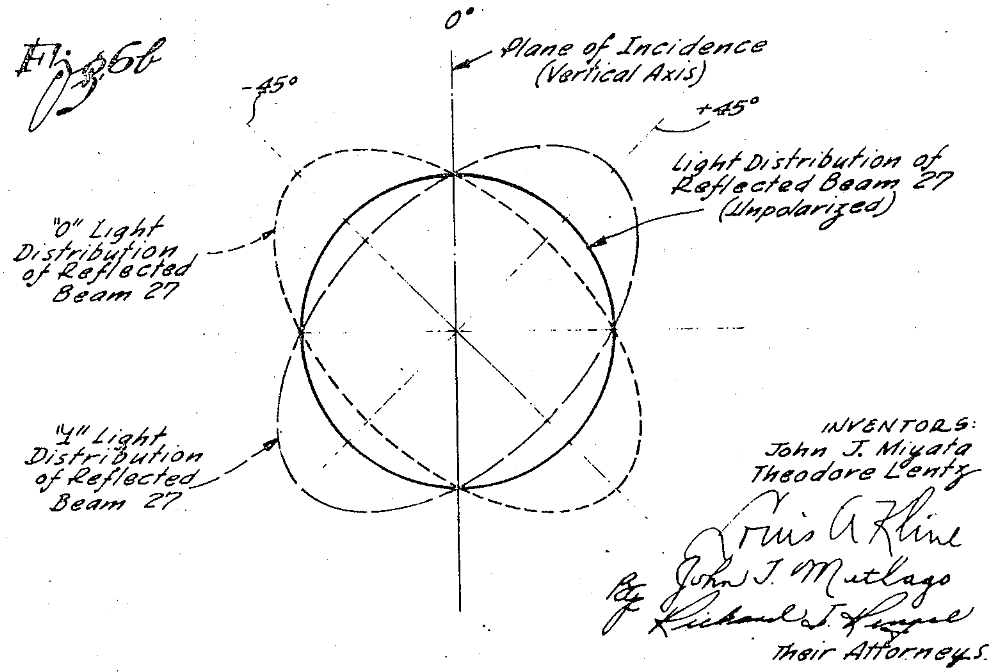
Figure 6A:
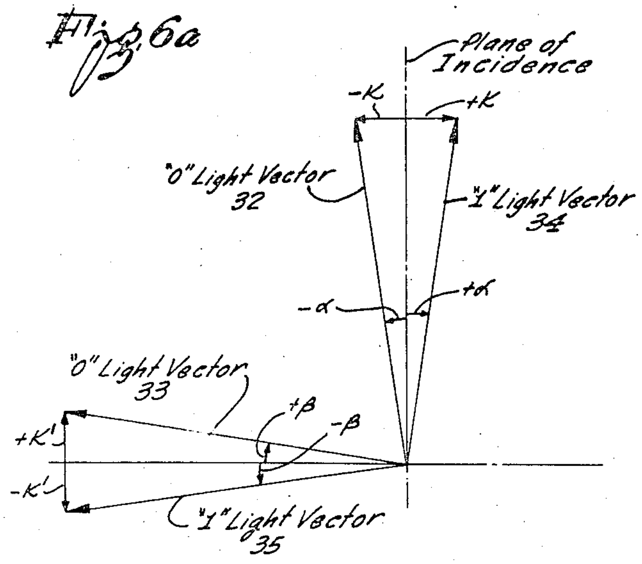
Figure 7:
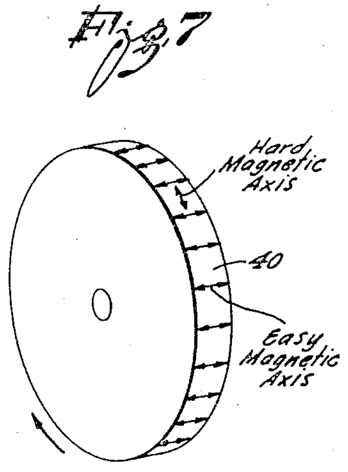
Figure 8:
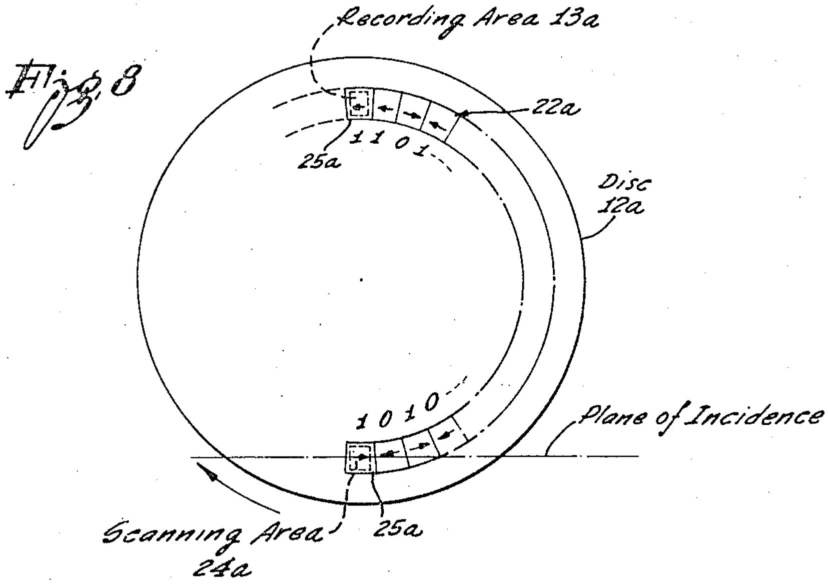

FIGS. 4*a* to 4*d* illustrate diagrammatically the manner in which binary signals are magnetically recorded and stored on a record surface shown in FIG. 1;

FIG. 5 illustrates typical electrical waveforms of binary signals which are magnetically recorded and optically and electronically reproduced by the system apparatus shown in FIG. 1;

FIG. 6*a* is a vector diagram of the various light components of partially polarized light reflected from the storage disc shown in FIG. 1;

FIG. 6*b* is a graph showing polar plots of light distribution of the reflected unpolarized light beam and the partially polarized light beams reflected from the storage disc shown in FIG. 1;

FIG. 7 is a digrammatic illustration of the remanent magnetization pattern of the peripheral recording surface of a drum providing an alternate storage means which replaces the storage disc of the preferred system apparatus shown in FIG. 1; and FIG. 8 is a diagrammatic illustration of a storage disc, similar in part to the storage disc shown in FIG. 1, in which typical binary signals are recorded and stored longitudinally along a signal track on the record surface, as indicated schematically.

Referring now to the drawings, wherein like reference characters designate like or corresponding parts throughout the several views, there is shown in FIG. 1 which illustrates a preferred embodiment, a magneto-optical recording and reproducing system in which binary electrical signals 11 supplied from a signal source 10 are recorded on a rotatable magnetic storage disc 12 by a conventional magnetic recording head 14 and reproduced by magneto-optical detection of the interaction between light and the magnetic field of the magnetically recorded binary signals. The optical apparatus for producing the interaction between the light and the magnetic field of the recorded binary signals includes a bright light source, an arc lamp 15, for example. A rectangular light beam 16 is produced by the light from the lamp 15 which passes through a small rectangular aperture 18. Preferably, the light from the lamp 15 is focused at the aperture 18 by a lens which is not shown. The rectangular light beam 16 is focused by a lens 20 onto an annular signal track 22 on the upper surface of the storage disc 12 to produce a small bright rectangular light spot, corresponding to the image of the aperture 18, in the bit scanning area 24. The storage disc 12 may be made of glass or other material capable of providing a rigid, smooth substrate for depositing a thin film or coating of ferromagnetic material by evaporation or other known methods. The particulars of the properties and characteristics of the thin film of ferromagnetic material will be set forth later on in the description of FIG. 2 and for the present it will be noted that the resulting thin film on the disc 12 which is used for storage purposes provides a smooth, uniform light-reflecting, record surface for the reflection of the light beam 16. The term "light," as used herein, is intended to include electromagnetic radiation generally, e.g., microwave radiation, ultraviolet light, and infrared light, and is not intended to be limited to the visible portion of the spectrum.

The light reflected from the upper surface of the storage disc 12 at the scanning area 24 is partially polarized by the interaction of the light and the magnetic field of the particular bit area 25 (FIG. 3) of the signal track 22 which is reflecting the light in the scanning area 24. The interaction of the light and the magnetic field of the bit area 25 in the scanning area 24 produces paritial polarization of the reflected light forming the partially polarized reflected light beam 27. The partial polarization results from optical rotation of light reflected from the record surface in the scanning area 24 which is magnetized parallel to the plane of incidence (indicated in FIG. 3) and in the plane of the thin film forming the record surface. The incident light in the beam 16 is unpolarized. The light reflected from the bit area 25 located in the scanning area 24 will be partially polarized by the magnetization of the bit area 25. The direction of rotation of the reflected light in the beam 27 and resulting light distribution pattern will depend upon the direction of magnetization of the particular bit area 25 (0 or 1) in the scanning area 24 as indicated by the polar plots of light distribution for bits 0 and 1 shown in FIG. 6*b*. The respective 0 and 1 bit areas 25 of the signal track 22 are magnetized in opposite directions, as indicated schematically by the arrows in FIG. 3, by the recording head 14 in response to nonreturn to zero binary signals 11, shown in FIG. 5(*a*), which are supplied from the signal source 10. As illustrated in FIG. 3, the directions of remanent states of magnetization of the bit areas for 0 and 1 in the annular signal track 22 are transverse, i.e., normal, to the signal track and the direction of the 0 state of magnetization is radially inward and the direction of the 1 state of magnetization is radially outward. This type of recording is referred to as transverse recording as distinguished from the more conventional longitudinal recording which is indicated schematically by the arrows in bit areas 25*a* of the annular signal track 22*a* shown in FIG. 8. The novel feature of self-orientation of the magnetization states of the bit areas for 0 and 1 bits in the two directions of remanent magnetization to produce a transverse recording will be discussed later on in the description of FIGS. 2 and 4*a* to 4*d*, inclusive.

As indicated in FIG. 3, the direction of magnetization of bit areas 25 are parallel to the plane of incidence when a particular bit area 25 is located in the scanning area 24, and optical rotation with resulting partial polarization of the light in beam 27 is produced in a known manner referred to as the Kerr effect and, more particularly, as the longitudinal or meridional Kerr effect. Briefly, this effect can be described as the optical rotation that results when light is reflected from a surface which is magnetized in the plane of the surface and parallel to the plane of incidence. The center lines of the incident and reflected beams 16 and 27 (FIG. 1) lie within the plane of incidence and define the plane of incidence which is indicated in FIG. 3. In FIG. 1, the plane of incidence is perpendicular to the plane of the storage disc 12 and passes through the plane of the disc 12 as indicated in FIG. 3. The optical rotation of light resulting from the interaction between the incident light and the magnetized surface, defined by the bit area 25 located in the scanning area 24, creates light component vectors (electric) which are perpendicular to the light components or vectors (electric) of the incident light. The light components of the unpolarized incident light can be resolved into two vectors which are parallel and perpendicular, respectively, to the plane of incidence.

As illustrated by the vector diagram of FIG. 6*a*, the light in beam 27 which is reflected from a bit area 25, that a magnetized in the 0 direction, will create Kerr component light vectors $-K$ and $+K'$ which are at right angles to the light vectors parallel and perpendicular to the plane of incidence, respectively. The 0 light vectors 32 and 33 are the resultant vectors of the reflected light beam 27 including the Kerr component vectors $-K$ and $+K'$. The 1 light vectors 34 and 35 are the resultant vectors of the light in beam 27 reflected from a 1 bit area including the Kerr component vectors $+K$ and $-K'$. In FIG. 6*a*, the angles of rotation of the light vectors in a clockwise direction are indicated as positive ($+\alpha$, $+\beta$)

and angles of rotation of the light vectors in a counterclockwise direction are indicated as negative ($-\alpha$, $-\beta$). Similarly, the Kerr components producing the rotation are indicated in FIG. 6*a* as positive or negative according to their general direction, i.e., clockwise or counterclockwise, respectively. The Kerr component light vectors have been greatly exaggerated in FIG. 6*a* for illustrating the operation.

In FIG. 6*b*, the various light distributions of the light beam 27 as reflected from a 0 bit area and a 1 bit area are illustrated by the polar graph. The light distribution of the beam 27 as reflected from an unmagnetized bit area is indicated by polar graph for purposes of explanation only since the bit areas are all magnetized in the 0 direction or the 1 direction in the non-return to zero binary signaling system. Also, the diagram has been simplified to the extent that the reflected light is indicated to be unpolarized in the absence of magnetization of the bit area 25 being scanned, therefore, if unpolarized light, e.g., from the light beam 16, is reflected from an unmagnetized bit area, the distribution of reflected light forming beam 27 will be unpolarized and the polar plot of the light distribution of beam 27 is a perfect circle as shown. The light in beam 27 reflected from a 0 and 1 bit area will be partially polarized and the maximum light component of the light beam 27 will be polarized at an angle of $-45°$ to the vertical plane of incidence for a 0 bit area and $+45°$ to the plane of incidence for a 1 bit area.

Figure 1A:
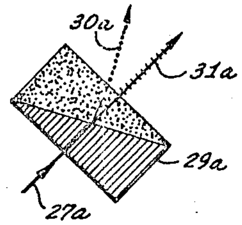

Referring again to FIG. 1, a polarizing light beam splitter 29 is disposed in the path of the light beam 27 to separate the light in the partially polarized beam 27, after passing through a collector lens 28, into two plane polarized beams 30 and 31 which are plane polarized at right angles to each other, i.e., $-45°$ and $+45°$, respectively, as shown in FIG. 6*b*. The beam splitter 29, for example, comprises a pile of glass plates which reflects the light polarized in the plane $-45°$ relative to the plane of incidence (FIG. 6*b*) to form the light beam 30 and passes the light polarized in the plane $+45°$ relative to the plane of incidence. Separation of light into two separate beams polarized at right angles to each other by means of a pile of glass plates is more fully described on pages 492 and 494 of the book "Fundamentals of Optics," by F. A. Jenkins and H. E. White and published by McGraw-Hill Book Co., Inc. Other suitable light polarization beam splitters for separating the light beam 27 into two plane polarized beams at right angles to one another are double-image prisms made of quartz or calcite cut at certain definite angles and cemented together with glycerine or castor oil (Rochon and Wollaston prisms) described on pages 504 and 505 of the same book. The beam splitter illustrated schematically in FIG. 1*a* is an alternate arrangement which employs a Rochon prism **29*a* to separate the partially polarized light beam 27*a* into two plane polarized light components 30*a* and 31*a* retaining both of the components for a later comparison of their intensities. The beam 27*a* has been partially polarized by reflection from one of the bit areas 25 disposed in the scanning area 24, and directed onto the prism 29*a* by the collector lens 28 in the same manner as beam 27 in FIG. 1. The light in beam 27*a* entering the first prism along its optical axis, indicated by the lines in the prism, undergoes double refraction at the boundary of the second prism having its optic axis perpendicular to the plane of the drawing, as indicated by the dots. The polarized light in beam 31*a* ($+45°$) is transmitted without deviation to be detected by photosensor P1 (FIG. 1) whereas the polarized light in beam 30*a* ($-45°$) is deflected as indicated to be detected by photosensor P0 (FIG. 1). The separate output signals of photosensors P0 and P1** (FIGS. 5*b* and 5*c*) are coupled to the differential amplifier 36 to provide the binary signal output shown in FIG. 5*d*.

Referring again to FIG. 1, a pair of photosensors P0 and P1, individual to the polarized light beams 30 and 31, respectively, are disposed in the respective paths of the beams as shown and are responsive to the variations of light intensity to produce the phototube output signals illustrated in FIGS. 5(*b*) and 5(*c*). The phototube output signals include both the binary signals and extraneous signals or random noise "spikes." The useful binary output signals of the phototubes are 180° out-of-phase, however, the noise due to fluctuation in intensity of light from the lamp 15 and reflectance variations of the record surface of the scanned bit areas are in phase. In combining the phototube output signals in a differential amplifier 36, the useful binary signals which are 180° out-of-phase will add, and in-phase extraneous signals will cancel, to reproduce the recorded binary signals as illustrated by the binary signals output in FIG. 5(*d*).

In FIG. 2, the directions of remanent magnetization of the annular recording surface of the storage disc 12 are illustrated schematically. A radial planar anisotropic film of ferromagnetic material is deposited on the storage disc 12 to provide the annular record surface for magnetically recording binary signals. The thin film is deposited in the presence of direct current, radial magnetic field which orients the remanent magnetization or easy magnetic axis of the thin film in radial directions as indicated by the arrows in FIG. 2 extending radially across the thin film record surface of the storage disc 12. The hard magnetic axis, which is normal to the easy magnetic axis, extends annularly about the record surface of the storage disc 12 as indicated by the circumferentially directed arrow in FIG. 2.

A strong, planar magnetic anisotropy is present in a thin film of ferromagnetic material which constrains the remanent magnetization to lie in the plane of the thin film. Uniaxial planar magnetic anisotropy, wherein the remanent magnetization is in predetermined directions, e.g., radial or parallel, can be created in a thin film which is deposited in the presence of a direct current magnetic field wherein the directions of the remanent magnetization or the easy magnetic axis are the same as those of the direct current magnetic field. Films of iron, cobalt, nickel, and the alloys of these metals deposited on substrates by evaporation or electrodeposition may be uniaxially magnetically anisotropic within the plane of the thin film when deposited in the presence of a direct current magnetic field. The direction of the direct current magnetic field determines the directions of remanent magnetization or easy magnetic axis in the deposited film. Another method of controlling the directions of remanent magnetization or easy magnetic axis is to provide an incident depositing vapor, which is directed oblique incident vapor produces a film having a rema- to it. The thin film deposited on the substrate by the oblique incident vapor produces a film having a remanent magnetization which is perpendicular to the direction of the vapor. An additional discussion of the deposition of thin films demonstrating strong planar anisotropic properties and remanent magnetization in parallel or radial directions can be found in chap. 7, pp. 112 to 124 of the book: "Magnetic Properties of Metal and Alloy" published by the American Society for Metals.

Figures 4A, 4B, 4C, 4D:
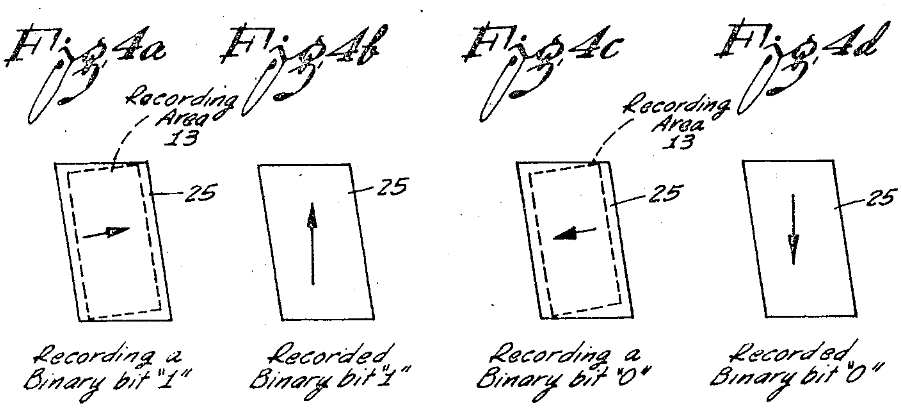

In FIGS. 4*a* to 4*d*, the manner in which the binary signals are recorded on the recording surface of storage disc 12 to provide a transverse recording is illustrated. The selected bit areas 25 shown in FIGS. 4*a* to 4*d* have been enlarged considerably, and the angle the recording area 13 forms with the radial easy magnetic axis or the radius of the storage disc 12 (see FIG. 3) is exaggerated to clarify the description of the operation. The record head 14 operates in the conventional manner to magnetically record the binary signals 11 in bit areas 25 except that the head is displaced at an extremely small angle relative to hard magnetic axis of the record surface to avoid instability, i.e., to assure that the direction of the remanent magnetization of all recorded binary bits 1 is radially outward and the direction of all recorded binary bits 0 is radially inward. The binary bit 1 is shown being recorded in the bit area 25 in the recording area 13 in FIG. 2 and in FIG. 4*a*. During the time interval the bit area 25 is in the recording area 13, the recording head 14 is producing a magnetic field for binary bit 1 which magnetizes the bit area 25 in the surface recording area 13 in a longitudinal direction as indicated by the arrow in FIG. 4*a*. However, after the bit area 25 leaves the recording area 13 the direction of magnetization turns from the hard magnetic axis in the longitudinal direction to the direction of the radial easy magnetic axis (radially outward) in the transverse direction, as indicated by the arrow in FIG. 4*b*. Magnetically recording a 0 binary bit is illustrated in FIGS. 4*c* and 4*d*. It is noted that the field produced by the record head 14 in the recording area 13 is in the opposite direction for magnetically recording the binary bit 0 in the bit area 25. The radial direction of magnetization of the recorded binary bit 0 (radially inward), as shown in FIG. 4*d*, is in the opposite direction from the recorded binary bit 1, as shown in FIG. 4*b*.

In FIG. 7, a drum has been shown as an alternate binary signal magnetic storage member having a uniaxial anisotropic magnetic film record surface 40 on its outer periphery in which the remanent magnetization or easy magnetic axis is indicated. The magnetic recording of binary signals 0 and 1 is made in the directions of the hard magnetic axis by a record head, e.g., the record head 14 shown in FIG. 1, in the same manner as set forth in the description of recording binary signals on the storage disc 12 shown in FIG. 1. Similarly, the binary signals are stored in the directions of the easy magnetic axis and optically and electronically reproduced, e.g., by the optical and electronic system apparatus illustrated diagrammatically in FIG. 1.

The transverse recording has been found to be much more favorable for high density recordings than conventional longitudinal recordings. Excellent reproductions have been made of binary signals recorded by conventional recording heads at densities of 3,000 bits per inch along a single signal track. Transverse recordings provide higher storage densities because of the straight domain walls between magnetically stored bits as compared to conventional longitudinal recordings which have ragged domain walls between stored bits. The resolution of the recorded signals in transverse recording enable higher densities of signals to be satisfactorily reproduced by a conventional magnetic read head or magneto-optical reproducing system while the coercivity of the film can be low (approximately 50 oersteds) which requires smaller recording current in the record head 14.

The optical and electronic apparatus shown in FIG. 1 is suitable for reproducing data stored magnetically in conventional longitudinal recordings as well as in transverse recordings as set forth in the preceding description of FIGS. 1 to 7, inclusive. The only requirement for reproducing the magnetically stored data by the system apparatus shown in FIG. 1 is that the plane of incidence be parallel to the directions of magnetization of the bit area being scanned by the light. In conventional longitudinal recordings the directions of magnetization of 0 and 1 bit areas are longitudinal as indicated schematically by the arrows in FIG. 8 rather than transverse as shown in FIG. 3.

On FIG. 8, a storage disc 12*a* is illustrated diagrammatically in which typical non-return to zero binary signals illustrated in FIG. 5*a* are recorded and stored longitudinally along a signal track 22*a* on the record surface of the disc as indicated schematically by the arrows in individual bit areas 25*a*. The nonreturn to zero binary signals are recorded on a thin film record surface of ferromagnetic material in the conventional manner in the recording area 13*a* to provide a longitudinal magnetic recording of the binary signals. The longitudinal recording of magnetically stored binary signals along the signal track 22*a* are reproduced by the optical and electronic system apparatus shown in FIG. 1 scanning the individual bit areas 25*a* in the scanning area 24*a*. The plane of incidence of the incident and reflected light beams is located as shown in FIG. 8 so that the directions of magnetization of a bit area 25*a* in the scanning area 24*a* is parallel to the plane of incidence to produce partial polarization of the reflected light in beam 27 as set forth in the description of the optical apparatus shown in FIG. 1. The optical and electronic detection and reproduction of the conventional longitudinal recording is otherwise the same as set forth in the description of FIG. 1 and a detailed discussion does not appear to be necessary for a complete understanding of the operation.

The system disclosed in the present invention represents a substantial advance over conventional recording systems and considerable improvement over the magneto-optical reproducing system disclosed in the prior co-pending application. Further, the present system for recording data is an entirely new concept in the recording field which provides surface data storage densities significantly greater than the storage densities obtainable in conventional recording systems.

Various modifications are contemplated and may obviously be resorted to by those skilled in the art without departing from the spirit and scope of the invention, as hereinafter defined by the appended claims, as only a preferred embodiment thereof has been disclosed.

What is claimed is:

1. A recording system comprising: a moveable magnetic record surface; means disposed adjacent said surface for magnetically recording data on said surface to produce a signal track comprising a series of areas on the surface which are capable of being magnetized in either one of two opposite directions for storing said data; means for forming a beam of light and directing said light beam onto said record surface and the signal track; means for producing relative movement between said record surface and the light directed on said surface for producing interaction between the light and the magnetized areas in said signal track whereby the light reflected from said areas is partially polarized in one or the other of two perpendicular planes depending upon the direction of magnetization in said areas; means disposed in the path of said partially polarized reflected light for splitting the partially polarized reflected light into two separate component light beams which are polarized in said perpendicular planes; means individual to each of said component light beams for detecting the light intensity of each beam to produce separate electrical signals in which the useful data portions are substantially 180° out-of-phase; and means for combining said separate electrical signals whereby useful data portions are additive to reproduce the data recorded on said surface.

2. A recording system comprising: a moveable magnetic record surface; means disposed adjacent said surface for magnetically recording data on said surface to produce a signal track comprising a series of magnetized areas on the surface which are magnetized in one or the other of two opposite directions for storing said data; means for forming a beam of light and directing said light beam onto said record surface and the signal track wherein a component of the light in said beam is parallel to the directions of magnetization of said magnetized areas; means for moving said record surface for producing interaction between the light and the magnetized areas in said signal track whereby the light reflected from said areas is partially polarized in one or the other of two perpendicular planes depending upon the direction of magnetization; polarization means disposed and arranged in the path of said partially polarized reflected light for separating the reflected light into two separate component light beams according to their respective plane of polarization component; means individual to each of said component light beams for detecting the light intensity of each beam to produce data signals which are substantially 180° out-of-phase and extraneous in-phase signals; and means for combining said data signals additively to reproduce the data recorded on said surface and cancel the extraneous in-phase signals.

3. A magnetic recording system comprising: a moveable storage member having a light-reflecting magnetic record surface; means for magnetically recording and storing binary data on said surface to provide a binary signal track comprising a series of areas on the surface which are capable of being magnetized in one of two opposite directions for storing said binary data; a source of light; means for forming light from said source into a beam and directing said light beam onto the signal track wherein the plane of incidence of said light beam is substantially parallel to the directions of magnetization of said magnetized areas; means for moving said storage member for producing interaction between the light and the magnetized areas in said signal track to produce a partially polarized reflected light beam in which the direction of partial polarization is dependent upon the direction of magnetization of the area reflecting the light; means disposed and arranged in the path of said partially polarized reflected light beam for separating the reflected light into two separate component light beams which are polarized in respective directions of polarization of the light reflected from the magnetized areas; means individual to each of said component light beams for detecting the light intensity of each beam to produce waveforms including binary signals which are substantially 180° out-of-phase and extraneous in-phase signals; and means for mixing said waveforms to combine said binary signals additively to reproduce the data recorded on said surface and substantially eliminate the extraneous in-phase signals.

4. An optical device for a magnetic storage system comprising: a magnetizable record surface capable of reflecting light provided with a magnetic recording; a source of light; means for forming a light spot on said magnetic recording to produce a partially polarized reflected light beam wherein the direction of partial polarization is dependent upon the magnetization of said magnetic recording; and light polarizing means having different angles of polarization disposed and arranged in the path of the reflected light beam for producing separate light beams having different angles of polarization which vary in intensity according to the direction of polarization of the partially polarized light beam.

5. A recording system comprising: a moveable record member having a light reflecting magnetizable surface; means for recording a binary magnetic pattern on said surface to provide a signal track; a source of light; means for directing light from said source onto the track whereby the light reflected from the surface is partially polarized in directions at right angles to one another by interaction with the magnetic pattern; light polarizing means disposed and arranged in the path of the reflected light for separating the reflected light in separate light beams according to the direction of partial polarization; means for detecting the intensity of the separate light beams to produce separate signal waveforms according to said binary magnetic pattern which waveforms include binary signals that are 180° out-of-phase and extraneous signals in-phase; and means for mixing said binary signals in-phase to reproduce the recorded binary pattern and for mixing said extraneous signals 180° out-of-phase for substantially eliminating said extraneous signals.

6. A high density magnetic storage system comprising: a moveable storage member having a record surface; drive means for moving said storage member; said record surface comprising a uniaxial, planar anisotropic film of ferromagnetic material having a remanent magnetization transverse to the direction of movement of said storage member and in the plane of said record surface; and magnetic means for recording a high density transverse magnetic pattern on said surface.

7. A transverse recording system for providing a high density magnetic recording of binary signals comprising: a moveable storage member having a record surface comprising an anisotropic coating of ferromagnetic material having an easy axis of remanent magnetization in the plane of said record surface; drive means for moving said storage member; and magnetic means for recording said binary signals in discrete areas on said record surface to form a signal track, said magnetic means producing magnetic fields magnetizing said areas in either one of two directions transverse to the easy magnetic axis in response to said binary signals whereby the direction of magnetization shifts to the easy magnetic axis in the absence of the magnetic field produced by said magnetic means.

8. Optical means for reproducing information magnetically recorded on a magnetizable record surface, said optical means comprising: means for producing a light beam and directing said light beam onto said record surface to reproduce said information by optical rotation of said light beam wherein the light in said beam is responsive to information magnetically recorded in said record surface to effect at least a partial polarization thereof; light polarizing means disposed and arranged in the path of said partially polarized light beam to detect the optical rotation produced by said magnetically recorded information by separation of the partially polarized light beam into at least two separate polarized light beams having a light intensity that is determined by optical rotation produced by the information being reproduced; means individual to each of said separate light beams for detecting the respective light intensities to produce separate electrical signals; and means for combining said separate electrical signals whereby the magnetically recorded information is reproduced.

9. The optical means according to claim 8 in which the magnetically recorded information includes magnetization in one direction and the opposite direction whereby light in said light beam is optically rotated in opposite directions to become at least partially polarized in response thereto and the light polarizing means is disposed and arranged in the path of said partially polarized light beam to detect the light rotation in opposite directions by producing separate, polarized beams of light, one of said separate light beams increasing in intensity and the other of said separate light beams decreasing in intensity as a result of said optical rotation.

10. A high density transverse recording system for recording digital data signals comprising: a record member having a uniaxial, planar anisotropic ferromagnetic record surface which constrains the remanent magnetization thereof in the plane of said record surface and along an easy axis; magnetic recording means having an input for said digital signals and producing shaped magnetic fields in either one or the other of opposite directions in the plane of the record surface in response to said digital signals; and drive means for producing relative movement of said record member and the magnetic recording means for producing a high density transverse magnetic recording of said digital signals along a signal track, said magnetic recording means being positioned and arranged to apply said magnetic fields along an axis which is transverse to said easy axis and also transverse to the direction of relative movement, said record surface being responsive to said magnetic fields to control the direction of magnetization along the easy axis to produce a high density transverse recording of the digital data signals along the signal track.

11. The high density transverse recording system according to claim 10 in which the record surface is substantially continuous to provide a continuous transverse recording along the signal track and the recording along the signal track comprises over 500 digital signals per inch and the directions of magnetization of adjacent signals recorded along said signal track are approximately parallel to provide linearity of the boundary between magnetization of adjacent recorded signals having opposite states of magnetization and in the plane of the uniaxial, planar ferromagnetic record surface.

12. The high density transverse recording system according to claim 10 wherein said magnetic recording means is positioned and arranged to produce said magnetic fields along an axis which is offset from the direction normal to said easy axis of remanent magnetization and also offset from the direction of relative movement whereby the applied magnetic fields are capable of producing a transverse recording along said signal track in which the magnetization states are transverse to the signal track and along said easy axis in accordance with the digital data signals applied to said input.

13. The high density transverse recording system according to claim 10 in which the magnetic recording means comprises a record head and the record member comprises a rotatable disc having a planar, uniaxial anisotropic ferromagnetic record surface in which the easy axis of remanent magnetization is radial and in the plane of the record surface.

14. The high density transverse recording system according to claim 10 in which the magnetic recording means comprises a record head and the record member comprises a rotatable drum having a planar, uniaxial anisotropic ferromagnetic record surface on the cylindrical periphery thereof in which the easy axis of remanent magnetization is substantially parallel to the axis of rotation of the drum and in the plane of the record surface.

15. A recording system for recording and reproducing high density digital data signals comprising: a record member having a uniaxial planar anisotropic ferromagnetic record surface which constrains the remanent magnetization thereof in the plane of said record surface and along an easy axis; magnetic recording means having an input for said digital signals and producing shaped magnetic fields in either one or the other of opposite directions in the plane of the record surface in response to said digital signals; means for producing relative movement of said record member and the magnetic recording means for producing a high density transverse magnetic recording of said digital signals along a signal track, said magnetic means being positioned and arranged to produce said magnetic fields along an axis which is transverse to said easy axis and also transverse to the direction of relative movement, said record surface being responsive to said magnetic fields to control the direction of magnetization along the easy axis to produce a high density recording of the binary signals along the signal track; and optical means for reproducing said high density recording of binary signals along said signal track including means for forming a beam of light and directing said light beam onto said record surface and the signal track to be reflected therefrom, said optical means being constructed and arranged to produce an incident light beam and a reflected light beam in a plane of incidence which is substantially perpendicular to the plane of the record surface and parallel to the easy axis of the record surface in the area of the signal track being reproduced, said optical means including polarizing means positioned and arranged in the path of said reflected light beam to produce at least two separate polarized light beams in which the angles of polarization are separated by approximately 90° from each other and 45° from said plane of incidence.

References Cited by the Examiner

UNITED STATES PATENTS

| | | | |
|---|---|---|---|
| 2,984,825 | 5/1961 | Fuller et al. | 340—174.1 X |
| 2,998,746 | 9/1961 | Gievers | 88—14 |
| 3,030,612 | 4/1962 | Rubens et al. | 340—174 |

OTHER REFERENCES

April 1, 1954—"Magnetic Domains by the Longitudinal Kerr Effect," by Fowler, Jr., and Fryer, Physical Review vol. 94 No. 1, Publication I.

Page 18, February 1959, "Magneto-Optic Hysteresigraph" IBM Tech. Dis. Bulletin, vol. 1 No. 5, publication II.

Page 67, August 1960, "Magneto-Optical Recording System" IBM Tech. Disclosure Bulletin vol. 3, No. 3, Publication III. Pages 822–823, January 1954. Buck, D. A. and Frank, W. I., Nondestructive Sensing of Magnetic Cores, in Communications and Electronics.

IRVING L. SRAGOW, *Primary Examiner.*